(12) United States Patent
Santoso et al.

(10) Patent No.: US 8,997,464 B2
(45) Date of Patent: Apr. 7, 2015

(54) WASTE HEAT RECOVERY SYSTEM WITH INTEGRATED HYDROCARBON ADSORBER, AND METHOD THEREOF

(71) Applicant: GM Global Technology Operations LLC, Detroit, MI (US)

(72) Inventors: Halim G. Santoso, Novi, MI (US); Eugene V. Gonze, Pinckney, MI (US); Chang H. Kim, Rochester, MI (US)

(73) Assignee: GM Global Technology Operations LLC, Detroit, MI (US)

(*) Notice: Subject to any disclaimer, the term of this patent is extended or adjusted under 35 U.S.C. 154(b) by 68 days.

(21) Appl. No.: 13/906,743

(22) Filed: May 31, 2013

(65) Prior Publication Data

US 2014/0352303 A1    Dec. 4, 2014

(51) Int. Cl.
*F01N 3/04* (2006.01)
*F02B 43/02* (2006.01)

(52) U.S. Cl.
CPC ...................................... *F02B 43/02* (2013.01)

(58) Field of Classification Search
USPC .............. 60/288, 320; 123/568.12, FOR. 126
See application file for complete search history.

(56) References Cited

U.S. PATENT DOCUMENTS

2012/0096927 A1*  4/2012  Freund .......................... 73/31.03

FOREIGN PATENT DOCUMENTS

JP         05044447 A  *  2/1993  ................ F01N 3/20
JP    2009293471 A  *  12/2009

OTHER PUBLICATIONS

Machine translation of JP 2009293471 A accessed Sep. 22, 2014.*
Machine translation of JP 05044447 A accessed Sep. 22, 2014.*

* cited by examiner

*Primary Examiner* — Kenneth Bomberg
*Assistant Examiner* — Jonathan Matthias
(74) *Attorney, Agent, or Firm* — Quinn Law Group, PLLC

(57) ABSTRACT

A waste heat recovery system with an integrated hydrocarbon adsorber for a vehicle having an internal combustion engine that generates exhaust gas containing hydrocarbons, and a catalytic converter, includes an exhaust gas conduit, an exhaust gas heat exchanger, a heat exchanger bypass valve, a coolant circuit with a coolant bypass and a coolant bypass valve, and a controller. The exhaust gas heat exchanger includes at least one channel through which the exhaust gas is flowable, the channel having an interior surface coated with a hydrocarbon adsorbing material configured to adsorb hydrocarbons. The heat exchanger and coolant bypass valves are configured to selectively direct at least a portion of the exhaust gas and the coolant, respectively, to the exhaust gas heat exchanger or to bypass it. They are controlled by the controller such that the hydrocarbons in the exhaust gas are selectively adsorbable by and desorbable from the coating.

15 Claims, 2 Drawing Sheets

WASTE HEAT RECOVERY SYSTEM WITH INTEGRATED HYDROCARBON ADSORBER, AND METHOD THEREOF

TECHNICAL FIELD

The present invention relates to a waste heat recovery system with an integrated hydrocarbon adsorber, and a method thereof.

BACKGROUND

Exhaust gas emitted from an internal combustion engine of a vehicle contains many air pollutants including, but not limited to, carbon monoxide (CO), unburned hydrocarbons, nitrogen oxides (NOx), and particulate matter. Many vehicles include vehicle emissions control devices, such as a catalytic converter, to convert some of these air pollutants into non-regulated exhaust gas components. Such devices often need to be at a minimum operating temperature in order to maximize the efficiency in treating the emissions. To effectively treat hydrocarbons in the exhaust gas in engine cold-start situations during which various components of the vehicle are below an operational temperature regime, some vehicles implement a hydrocarbon adsorber module to trap hydrocarbon emissions before they are exhausted. This allows them to be treated once the component, such as the catalytic converter, reaches the minimum operating temperature.

Many vehicles also include an exhaust gas heat recovery (EGHR) apparatus and/or system to utilize waste heat in the exhaust gas. In such systems, the waste heat may be transferred to coolant used in other systems in the vehicle via a heat exchanger or exhaust gas recirculation (EGR) cooler. The resulting cooled exhaust gas may also be recirculated to the intake manifold of the internal combustion engine.

SUMMARY

A waste heat recovery system with an integrated hydrocarbon adsorber in a vehicle is provided. The vehicle generally has an internal combustion engine that generates exhaust gas containing hydrocarbons, and a catalytic converter. The waste heat recovery system includes an exhaust gas conduit in fluid communication with the internal combustion engine and the catalytic converter. The exhaust gas is flowable from the internal combustion engine to the catalytic converter through the exhaust gas conduit.

The waste heat recovery system also includes an exhaust gas heat exchanger configured to receive at least a portion of the exhaust gas from the exhaust gas conduit to enable heat transfer between the exhaust gas and a coolant. The exhaust gas heat exchanger has at least one channel through which the gas is flowable. The at least one channel has an interior surface with a coating made of a hydrocarbon adsorbing material.

The waste heat recovery system also includes an exhaust gas bypass valve configured to selectively direct the exhaust gas to the exhaust gas heat exchanger, or to bypass the exhaust gas heat exchanger.

The waste heat recovery system further includes a coolant circuit in fluid communication with the exhaust gas heat exchanger. The coolant circuit is configured to circulate the coolant through the exhaust gas heat exchanger such that heat is transferable from the exhaust gas to the coolant. The coolant circuit includes a coolant bypass and a coolant bypass valve. The coolant bypass valve is configured to selectively direct at least a portion of the coolant to the exhaust gas heat exchanger, or through the coolant bypass such that the exhaust gas bypasses the exhaust gas heat exchanger.

The waste heat recovery system further includes a controller configured to control the exhaust gas bypass valve and the coolant bypass valve based on at least one parameter. This allows for hydrocarbons in the exhaust gas to be adsorbed by and desorbed from the coating of the at least one channel.

A method of sending hydrocarbons in exhaust gas generated by an internal combustion engine to a catalytic converter in a vehicle is also provided. The method utilizes the waste heat recovery system described above. The method first includes determining, by a controller, whether the catalytic converter has a temperature above or below an optimal operating temperature.

After determining that the temperature of the catalytic converter is below the optimal operating temperature, the method then includes directing at least a portion of the exhaust gas and at least a portion of the coolant to the exhaust gas heat exchanger to maintain the at least one channel at a temperature below an adsorption threshold temperature. Below this adsorption threshold temperature, the hydrocarbons in the exhaust gas are adsorbed by the coating of the at least one channel until the catalytic converter is above the optimal operating temperature.

After determining that the temperature of the catalytic converter is above the optimal operating temperature, the method then includes directing the exhaust gas and the coolant to substantially bypass the exhaust gas heat exchanger.

The method then includes determining, by the controller, whether the coating has any hydrocarbons trapped in it. After determining that the coating has hydrocarbons trapped in it, the method then includes increasing the exhaust gas to the exhaust gas heat exchanger to heat the at least one channel above a desorption threshold temperature. Above this desorption threshold temperature, the hydrocarbons trapped in the coating are desorbed and are reintroduced into the exhaust gas to be received by the catalytic converter.

The above features and advantages and other features and advantages of the present invention are readily apparent from the following detailed description of the best modes for carrying out the invention when taken in connection with the accompanying drawings.

DETAILED DESCRIPTION

Those having ordinary skill in the art will recognize that terms such as "above," "below," "upward," "downward," et cetera, are used descriptively of the figures, and do not represent limitations on the scope of the invention, as defined by the appended claims. Any numerical designations, such as "first" or "second" are illustrative only and are not intended to limit the scope of the invention in any way.

Figure 1A:
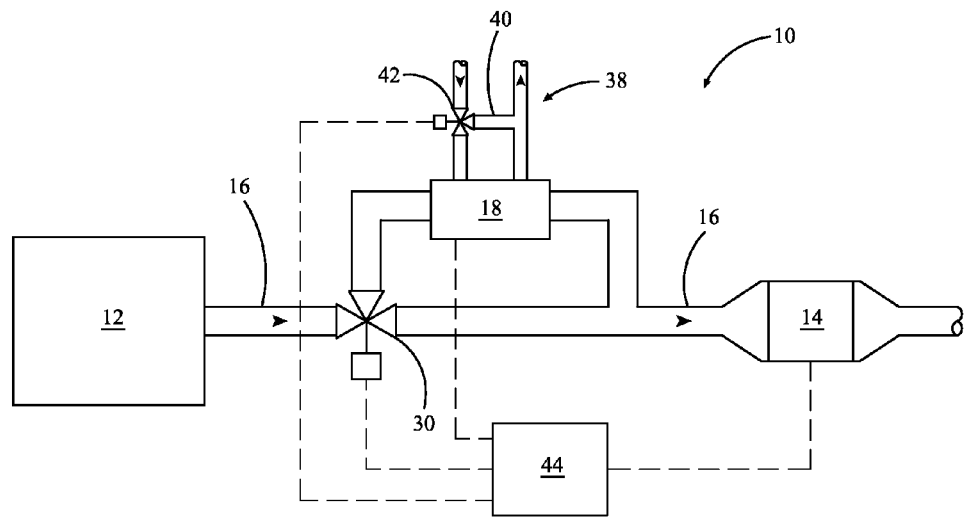
FIGS. 1A and 1B are schematic flow diagrams of a waste heat recovery system according to different embodiments.
Figure 1B:
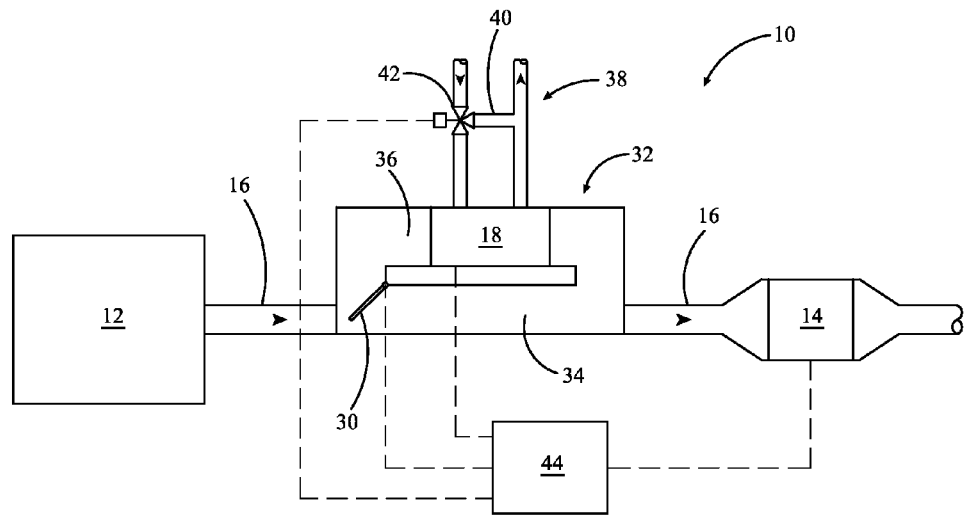

Referring to the drawings, wherein like reference numbers correspond to like or similar components wherever possible throughout the several figures, a waste heat recovery system 10 in a vehicle (not shown) is shown in FIGS. 1A and 1B. The vehicle generally includes an internal combustion engine 12 and a catalytic converter 14. The internal combustion engine 12 generates exhaust gas, and the catalytic converter 14 converts pollutants in the exhaust gas, such as unburned hydrocarbons, to non-toxic molecules. The catalytic converter 14 may be an underfloor converter.

The waste heat recovery system 10 is utilized to recover waste heat from the exhaust gas by transferring it to a coolant. The waste heat recovery system 10 is further utilized to adsorb hydrocarbons in the exhaust gas as the catalytic converter 14 heats up to an optimal operating temperature, such as during an engine cold-start of the vehicle, as described in more detail hereinafter.

The waste heat recovery system 10 generally includes an exhaust gas conduit 16 and an exhaust gas heat exchanger 18. The exhaust gas conduit 16 is in fluid communication with the internal combustion engine 12 and the catalytic converter 14. The exhaust gas is flowable from the internal combustion engine 12 to the catalytic converter 14 through the exhaust gas conduit 16.

The exhaust gas heat exchanger 18 is configured to receive exhaust gas from the exhaust gas conduit 16, and to enable heat transfer between the exhaust gas and the coolant, as mentioned above.

Figure 2:
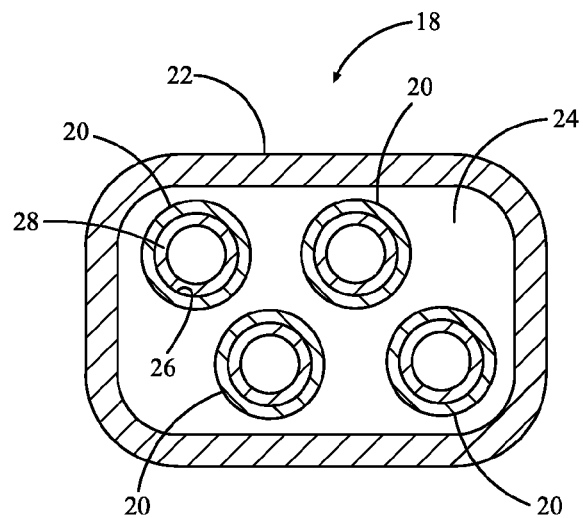
FIG. 2 is a schematic, cross-sectional view of an exhaust gas heat exchanger of the waste heat recovery system of FIGS. 1A and 1B.

Referring now to FIG. 2, the exhaust gas heat exchanger 18 generally includes channels 20 and a casing 22 that defines an internal chamber 24 around the channels 20. The channels 20 are configured to allow the exhaust gas to flow through them. The internal chamber 24 is configured to enable the heat transfer between the exhaust gas and the coolant by receiving the coolant such that it is in contact with the channels 20. Each of the channels 20 generally is any passageway capable of allowing the exhaust gas to flow through it. For example, in one embodiment, the channels 20 may be tubes, as depicted in FIG. 2. In another embodiment not shown, the channels 20 may be hollow plates.

While FIG. 2 shows the exhaust gas heat exchanger 18 as having four channels 20, it should be appreciated that it may have any number of channels 20. In addition, while FIG. 2 shows the exhaust gas heat exchanger 18 as having a substantially rectangular cross-section, it should be appreciated that it may have a cross-section of any regular or irregular geometric shape, including, but not limited to, a circle.

Each channel 20 has an interior surface 26 with a coating 28. The coating 28 generally is made of a hydrocarbon adsorbing material, including, but not limited to, micro- and meso-porous material such as zeolite. The coating 28 serves as a hydrocarbon adsorber, and is configured to adsorb the hydrocarbons in the exhaust gas. This allows for a reduced amount of hydrocarbons from being exhausted from the vehicle when the catalytic converter 14 is below the optimal operating temperature, such as during an engine cold-start condition, as mentioned above.

Referring back to FIGS. 1A and 1B, the waste heat recovery system 10 also includes a heat exchanger bypass valve 30. The heat exchanger bypass valve 30 is configured to selectively direct at least a portion of the exhaust gas from the exhaust gas conduit 16 to the exhaust gas heat exchanger 18, or to substantially bypass the exhaust gas heat exchanger 18. The heat exchanger bypass valve 30 may be electrically actuated, and may be, but is not limited to, a three-way valve, as depicted in FIG. 1A, or a flapper valve, as depicted in FIG. 1B.

The exhaust gas heat exchanger 18 and the exhaust gas bypass valve 30 may be part of an exhaust gas heat recovery (EGHR) apparatus 32, as seen in FIG. 1B. The EGHR apparatus 32 is in fluid communication with the exhaust gas conduit 16, and is located downstream of the internal combustion engine 12 and upstream of the catalytic converter 14. The EGHR apparatus 32 may include a first passageway 34 and a second passageway 36 through which the exhaust gas is flowable. In such an embodiment, the exhaust gas heat exchanger 18 may be located in the second passageway 36. The heat exchanger bypass valve 30 may selectively direct the exhaust gas to flow to the exhaust gas heat exchanger 18 through the second passageway 36, or to bypass the exhaust gas heat exchanger 18 through the first passageway 34.

The waste heat recovery system 10 also includes a coolant circuit 38 in fluid communication with the exhaust gas heat exchanger 18. The coolant circuit 38 is configured to circulate the coolant through the internal chamber 24 such that heat is transferable between the exhaust gas and the coolant. The coolant circuit 38 includes a coolant bypass 40 and a coolant bypass valve 42. The coolant bypass valve 42 is configured to selectively direct at least a portion of the coolant to the exhaust gas heat exchanger 18, or through the coolant bypass 40 such that the coolant substantially bypasses the exhaust gas heat exchanger 18. As with the heat exchanger bypass valve 30, the coolant bypass valve 42 may be electronically actuated, and may be, but is not limited to, a three-way valve.

The waste heat recovery system 10 further includes at least one controller 44 to control the flow of the exhaust gas and the flow of the coolant. The controller 44 may be electrically connected to at least one of the heat exchanger bypass valve 30, the coolant bypass valve 42, the exhaust gas heat exchanger 18, and/or the catalytic converter 14, as represented by the dashed lines in FIGS. 1A and 1B. The controller 44 is configured to control the heat exchanger bypass valve 30 and the coolant bypass valve 42 based on at least one parameter. The parameter may be, but is not limited to, the temperature within the channels 20 of the exhaust gas heat exchanger 18, and/or the temperature within the catalytic converter 14. These temperatures may be measured by temperature sensors (not shown) located in the respective locations. Alternatively, the controller 44 may be configured to determine the temperatures based on other operating parameters, including, but not limited to, the flow rate of the exhaust gas, which may be measured by flow sensors (not shown) located in the respective locations.

As explained above, to effectively treat the hydrocarbons and other pollutants in the exhaust gas, the catalytic converter 14 should be above an optimal operating temperature. In one embodiment, the optimal operating temperature may be 250 degrees Celsius. When the temperature of the catalytic converter 14 is below this temperature, then the controller 44 may control the heat exchanger bypass valve 30 to direct the exhaust gas to flow through the exhaust gas heat exchanger 18 such that the hydrocarbons in the exhaust gas may be adsorbed by the coating 28 of each of the channels 20.

In order for the coating 28 of each of the channels 20 to adsorb the hydrocarbons, the temperature within the channels 20 must be below an adsorption threshold temperature. In one embodiment in which the hydrocarbon adsorbing material of the coating 28 is zeolite, the adsorption threshold temperature may be 60 degrees Celsius. To accomplish this, the controller 44 may direct the coolant bypass valve 42 to direct the coolant to flow through the exhaust gas heat exchanger 18 in which the coolant may cool the exhaust gas below the adsorption threshold temperature. The amount of coolant flowing to the exhaust gas heat exchanger 18, and therefore the position of the coolant bypass valve 42, is dependent upon how much the exhaust gas must be cooled to fall below the adsorption threshold temperature.

After the temperature of the catalytic converter 14 raises above the optimal operating temperature, the exhaust gas may be sent directly to the catalytic converter 14, bypassing the exhaust gas heat exchanger 18, such that the hydrocarbons may be treated without having first been adsorbed. To achieve this, the controller 44 may set the heat exchanger bypass valve 30 in a position to direct the exhaust gas to substantially bypass the exhaust gas heat exchanger 18. In addition, the coolant is no longer necessary to cool the exhaust gas, and as such, the controller 44 may set the coolant bypass valve 42 in a position to direct the coolant to flow through the coolant bypass 40, thereby also substantially bypassing the exhaust gas heat exchanger 18.

The controller 44 further may be configured to determine if there are any hydrocarbons trapped in the coating 28. After the temperature of the catalytic converter 14 is above the optimal operating temperature, these hydrocarbons then may be desorbed and reintroduced into the exhaust gas to be received by the catalytic converter 14. In order for desorption to occur, the temperature within the channels 20 must be above a desorption threshold temperature. In one embodiment in which the hydrocarbon adsorbing material of the coating 28 is zeolite, the desorption threshold temperature may be 100 degrees Celsius. To accomplish this, the controller 44 may control the heat exchanger bypass valve 30 to gradually open and increase the flow of exhaust gas to the exhaust gas heat exchanger 18, thereby raising the temperature within the channels 20 above the desorption threshold temperature.

Figure 3:
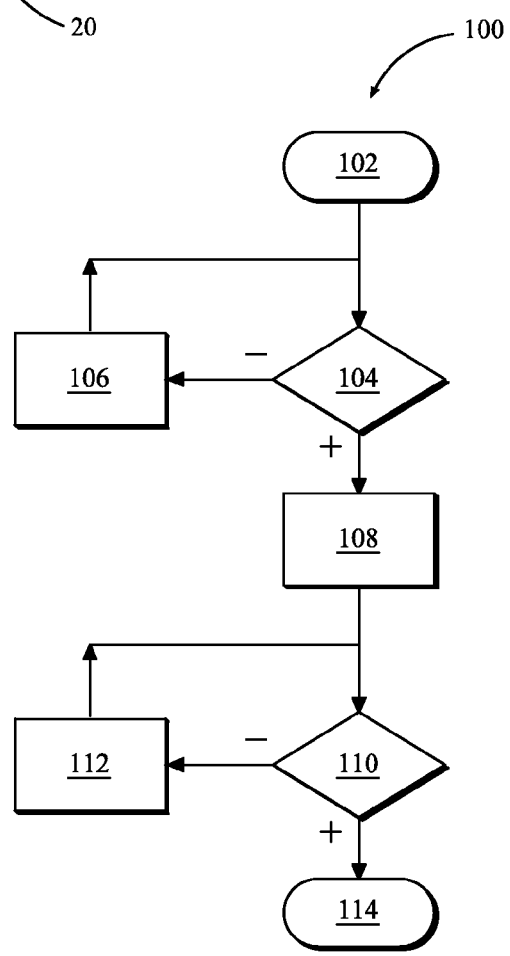
FIG. 3 is a schematic flow diagram illustrating a method of operating the waste heat recovery system of FIGS. 1A and 1B.

Referring now to FIG. 3, a method 100 for sending hydrocarbons in the exhaust gas from the internal combustion engine 12 to the catalytic converter 14 is shown. Method 100 utilizes the waste heat recovery system 10 described above. Method 100 begins at step 102, in which the internal combustion engine 12 is generating exhaust gas, and the catalytic converter 14 has a temperature.

After step 102, method 100 proceeds to step 104. At step 104, the controller 44 determines whether the temperature of the catalytic converter 14 is above or below an optimal operating temperature. As explained above, in order for the catalytic converter to effectively process the pollutants, such as the hydrocarbons, it must be above the optimal operating temperature. Also as explained above, in one embodiment, the optimal operating temperature may be 250 degrees Celsius.

If the temperature of the catalytic converter 14 is above the optimal operating temperature, as indicated by the (+) sign in FIG. 3, then method 100 proceeds directly to step 108 described below. If the temperature of the catalytic converter 14 is below the optimal operating temperature, as indicated by the (−) sign in FIG. 3, then method 100 proceeds to step 106.

At step 106, at least a portion of the exhaust gas and at least a portion of the coolant are directed to the exhaust gas heat exchanger 18. As explained above, the coating 28 of the channels 20 are made of a hydrocarbon adsorbing material, which allows the hydrocarbons in the exhaust gas to be adsorbed while the catalytic converter 14 is being heated to the optimal operating temperature. However, in order for adsorption to occur, the temperature within the channels 20 must be below an adsorption threshold temperature. As explained above, in one embodiment, the adsorption threshold temperature may be 60 degrees Celsius.

The controller 44 may set the heat exchanger bypass valve 30 and the coolant bypass valve 42 in respective positions to allow the exhaust gas and the coolant to flow to the exhaust gas heat exchanger 18. The exact amount of flow of each may depend upon the amount that the exhaust gas needs to be cooled.

Steps 104 and 106 are repeated until the temperature of the catalytic converter 14 is above the optimal operating temperature. Method 100 then proceeds to step 108.

At step 108, the exhaust gas and the coolant are directed to substantially bypass the exhaust gas heat exchanger 18. As explained above, once the catalytic converter 14 has reached the optimal operating temperature, it may then treat the hydrocarbons in the exhaust gas, and as such, adsorption of the hydrocarbons is no longer necessary. The controller 44 may set the heat exchanger bypass valve 30 and the coolant bypass valve 42 in respective positions such that the exhaust gas and the coolant, respectively, bypass the exhaust gas heat exchanger 18.

After step 108, method 100 proceeds to step 110. At step 110, the controller 44 determines whether the coating 28 of each of the channels 20 has any hydrocarbons trapped in it. If it does, as indicated by the (−) sign in FIG. 3, then method 100 proceeds to step 112. If it does not, as indicated by the (+) sign in FIG. 3, then method 100 ends at step 114.

At step 112, the exhaust gas to the exhaust gas heat exchanger 18 is gradually increased. This raises the temperature within the channels 20 above a desorption threshold temperature, as described above. The hydrocarbons trapped in the coating 28 are then desorbed from the coating 28 and are reintroduced into the exhaust gas. The exhaust gas, with the hydrocarbons, may then be received by the catalytic converter 14 for them to be treated, as explained above.

Steps 110 and 112 are repeated until the controller 44 determines that there are no hydrocarbons trapped in the coating 28 of any of the channels 20. Method 100 then ends at step 114.

The detailed description and the drawings or figures are supportive and descriptive of the invention, but the scope of the invention is defined solely by the claims. While some of the best modes and other embodiments for carrying out the claimed invention have been described in detail, various alternative designs and embodiments exist for practicing the invention defined in the appended claims.

The invention claimed is:

1. A waste heat recovery system with an integrated hydrocarbon adsorber for a vehicle having an internal combustion engine that generates exhaust gas containing hydrocarbons, and a catalytic converter, the waste heat recovery system comprising:
    an exhaust gas conduit in fluid communication with the internal combustion engine and the catalytic converter, the exhaust gas being flowable from the internal combustion engine to the catalytic converter through the exhaust gas conduit;
    an exhaust gas heat exchanger configured to receive at least a portion of the exhaust gas from the exhaust gas conduit to enable heat transfer between the exhaust gas and a coolant, the exhaust gas heat exchanger having at least one channel through which the exhaust gas is flowable, the at least one channel having an interior surface with a coating made of a hydrocarbon adsorbing material;
    a heat exchanger bypass valve configured to selectively direct at least a portion of the exhaust gas from the exhaust gas conduit to the exhaust gas heat exchanger or to bypass the exhaust gas heat exchanger;
    a coolant circuit in fluid communication with the exhaust gas heat exchanger, the coolant circuit being configured to circulate the coolant through the exhaust gas heat exchanger such that heat is transferable between the exhaust gas and the coolant, the coolant circuit having a coolant bypass and a coolant bypass valve configured to selectively direct at least a portion of the coolant to the exhaust gas heat exchanger or through the coolant bypass such that the coolant bypasses the exhaust gas heat exchanger; and a controller configured to control the heat exchanger bypass valve and the coolant bypass valve based on at least one parameter such that the hydrocarbons in the exhaust gas are selectively adsorbable by and desorbable from the coating.

2. The waste heat recovery system of claim 1 wherein the hydrocarbon adsorbing material is zeolite.

3. The waste heat recovery system of claim 1 wherein the at least one parameter is at least one of a temperature within the at least one channel of the exhaust gas heat exchanger and a temperature within the catalytic converter.

4. The waste heat recovery system of claim 3 wherein the controller is configured to set the heat exchanger bypass valve and the coolant bypass valve in respective positions such that at least a portion of the exhaust gas and at least a portion of the coolant flow into the exhaust gas heat exchanger to maintain the temperature within the at least one channel below an adsorption threshold temperature such that the coating adsorbs the hydrocarbons in the exhaust gas.

5. The waste heat recovery system of claim 3 wherein the controller is configured to set the heat exchanger bypass valve and the coolant bypass valve in respective positions such that the exhaust gas and the coolant substantially bypass the exhaust gas heat exchanger when the temperature within the catalytic converter is above an optimal operating temperature.

6. The waste heat recovery system of claim 3 wherein the controller is configured to adjust the heat exchanger bypass valve to increase the exhaust gas flowing through the exhaust gas heat exchanger to increase the temperature of the exhaust gas within the exhaust gas heat exchanger above a desorption threshold temperature such that any hydrocarbons adsorbed by the adsorption layer are desorbed from the coating and are introduced into the exhaust gas.

7. A waste heat recovery system with an integrated hydrocarbon adsorber for a vehicle having an internal combustion engine that generates exhaust gas containing hydrocarbons, and a catalytic converter, the waste heat recovery system comprising:

an exhaust gas conduit in fluid communication with the internal combustion engine and a catalytic converter, the exhaust gas being flowable from the internal combustion engine to the catalytic converter through the exhaust gas conduit;

an exhaust gas heat recovery (EGHR) apparatus in fluid communication with the exhaust gas conduit, the EGHR apparatus being located downstream of the internal combustion engine and upstream of the catalytic converter, the EGHR apparatus having:

a first passageway and a second passageway through which the exhaust gas is flowable;

an exhaust gas heat exchanger located in the second passageway, the exhaust gas heat exchanger being configured to enable heat transfer between the exhaust gas and a coolant, the exhaust gas heat exchanger having at least one channel through which the exhaust gas is flowable, the at least one channel having an interior surface with a coating made of a hydrocarbon adsorbing material; and a heat exchanger bypass valve configured to selectively direct at least a portion of the exhaust gas through at least one of the first passageway and the second passageway;

a coolant circuit in fluid communication with the exhaust gas heat exchanger, the coolant circuit being configured to circulate the coolant through the exhaust gas heat exchanger such that heat is transferable between the exhaust gas and the coolant, the coolant circuit having a coolant bypass and a coolant bypass valve configured to selectively direct at least a portion of the coolant to the exhaust gas heat exchanger or through the coolant bypass such that the coolant bypasses the exhaust gas heat exchanger; and a controller configured to control the heat exchanger bypass valve and the coolant bypass valve based on at least one parameter such that the hydrocarbons in the exhaust gas are selectively adsorbable by and desorbable from the coating.

8. The waste heat recovery system of claim 7 wherein the hydrocarbon adsorbing material is zeolite.

9. The waste heat recovery system of claim 7 wherein the at least one parameter is at least one of a temperature within the at least one channel of the exhaust gas heat exchanger and a temperature within the catalytic converter.

10. The waste heat recovery system of claim 9 wherein the controller is configured to set the heat exchanger bypass valve and the coolant bypass valve in respective positions such that at least a portion of the exhaust gas and at least a portion of the coolant flow into the exhaust gas heat exchanger to maintain the temperature within the at least one channel below an adsorption threshold temperature such that the coating adsorbs the hydrocarbons in the exhaust gas.

11. The waste heat recovery system of claim 9 wherein the controller is configured to set the heat exchanger bypass valve and the coolant bypass valve in respective positions such that the exhaust gas and the coolant substantially bypass the exhaust gas heat exchanger when the temperature within the catalytic converter is above an optimal operating temperature.

12. The waste heat recovery system of claim 9 wherein the controller is configured to adjust the heat exchanger bypass valve to increase the exhaust gas flowing through the exhaust gas heat exchanger to increase the temperature of the exhaust gas within the exhaust gas heat exchanger above a desorption threshold temperature such that any hydrocarbons adsorbed by the adsorption layer are desorbed from the coating and are introduced into the exhaust gas.

13. A method of sending hydrocarbons in exhaust gas from an internal combustion engine to a catalytic converter in a vehicle via a waste heat recovery system having an exhaust gas heat exchanger configured to enable heat transfer between the exhaust gas and a coolant, the exhaust gas heat exchanger having at least one channel through which the exhaust gas is flowable, the at least one channel having an interior surface with a coating made of a hydrocarbon adsorbing material, the method comprising:

determining, by a controller, whether the catalytic converter is at a temperature above or below an optimal operating temperature;

after determining that the temperature of the catalytic converter is below the optimal operating temperature, directing at least a portion of the exhaust gas and at least a portion of the coolant to the exhaust gas heat exchanger to maintain the at least one channel of the exhaust gas heat exchanger below an adsorption threshold temperature such that the hydrocarbons in the exhaust gas are adsorbed by the coating of the at least one channel until the catalytic converter is above the optimal operating temperature;

after determining that the temperature of the catalytic converter is above the optimal operating temperature, directing the exhaust gas and the coolant to substantially bypass the exhaust gas heat exchanger;

determining, by the controller, whether the coating has any hydrocarbons trapped in it; and after determining that the coating has hydrocarbons trapped in it, increasing the exhaust gas to the exhaust gas heat exchanger to heat the at least one channel above a desorption threshold temperature until the hydrocarbons trapped by the coating are desorbed and are reintroduced into the exhaust gas to be received by the catalytic converter.

14. The method of claim 13 wherein the waste heat recovery system further includes a coolant bypass valve and a heat exchanger bypass valve configured to selectively direct at least a portion of the coolant and at least a portion of the exhaust gas, respectively, to flow through or to bypass the exhaust gas heat exchanger.

15. The method of claim 13 wherein the hydrocarbon adsorbing material is zeolite.

* * * * *